United States Patent
Landis et al.

[15] 3,668,942
[45] June 13, 1972

[54] INDEXING MECHANISM
[72] Inventors: Donald E. Landis; Mohanjit S. Sidhu, both of Cambridge, Ohio
[73] Assignee: The National Cash Register Company, Dayton, Ohio
[22] Filed: June 5, 1970
[21] Appl. No.: 43,815

[52] U.S. Cl..............................74/125, 74/142, 226/145, 226/157
[51] Int. Cl..........................F16h 29/00, B65h 17/22
[58] Field of Search.............74/118, 122, 124, 125, 125.5, 74/142, 143; 226/157, 144, 145

[56] References Cited

UNITED STATES PATENTS

| | | | |
|---|---|---|---|
| 924,103 | 6/1909 | Von Philp | 226/157 |
| 2,530,961 | 11/1950 | Hansen | 226/157 X |
| 2,825,441 | 3/1958 | Tholstrup | 226/157 X |
| 2,904,167 | 9/1959 | Guess | 226/157 |
| 2,934,753 | 4/1960 | Laman | 226/157 X |
| 3,131,570 | 5/1964 | White | 74/125 |
| 3,465,937 | 9/1969 | Gruver et al. | 226/157 X |

Primary Examiner—William F. O'Dea
Assistant Examiner—P. D. Ferguson
Attorney—Kline, Louis A., Wilbert Hawk, Jr. and Richard W. Lavin

[57] ABSTRACT

A high-speed indexing mechanism, for moving a member to a printing position, which includes an indexing shaft on which are mounted an indexing drive wheel and a clutch member operated by a cam follower arm. A cam member rotates the cam follower arm to drive the indexing shaft, which moves the member to a printing position by means of the indexing drive wheel. The clutch allows the indexing shaft to be rotated in one direction by the cam follower arm. A second clutch member is mounted on the indexing shaft to provide a drag on the indexing shaft. To provide a more accurate indexing mechanism, a ratchet wheel is mounted on the indexing shaft to control the length of rotation of the indexing shaft by the cam follower arm. An electromagnet operates to latch the cam follower arm, thus controlling the operation of the indexing mechanism.

14 Claims, 4 Drawing Figures

INVENTORS
DONALD E. LANDIS &
MOHANJIT S. SIDHU

BY

THEIR ATTORNEY

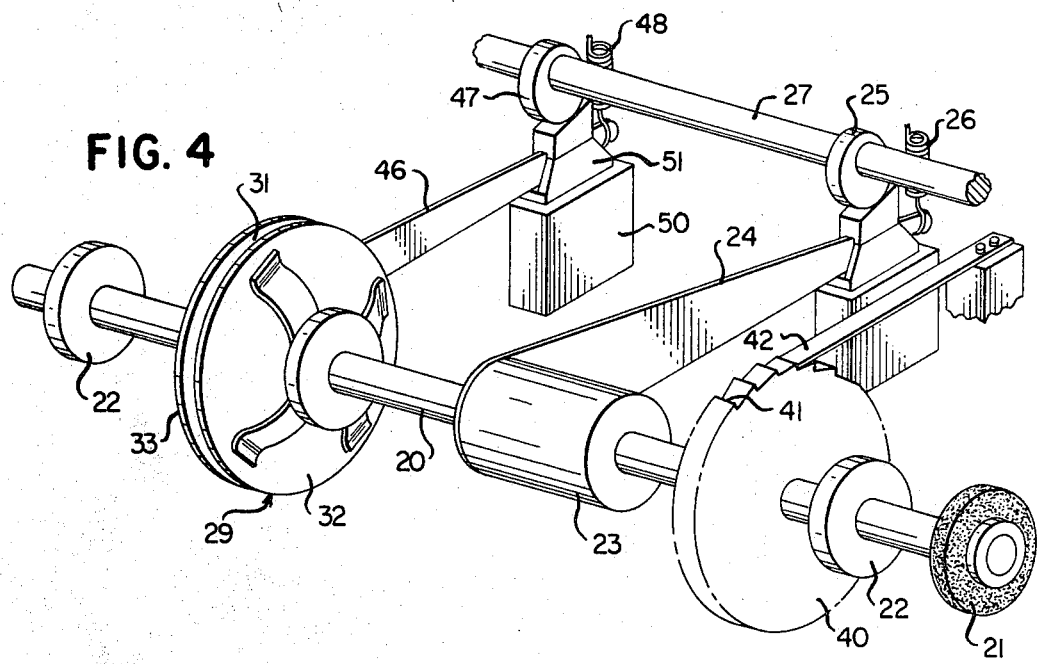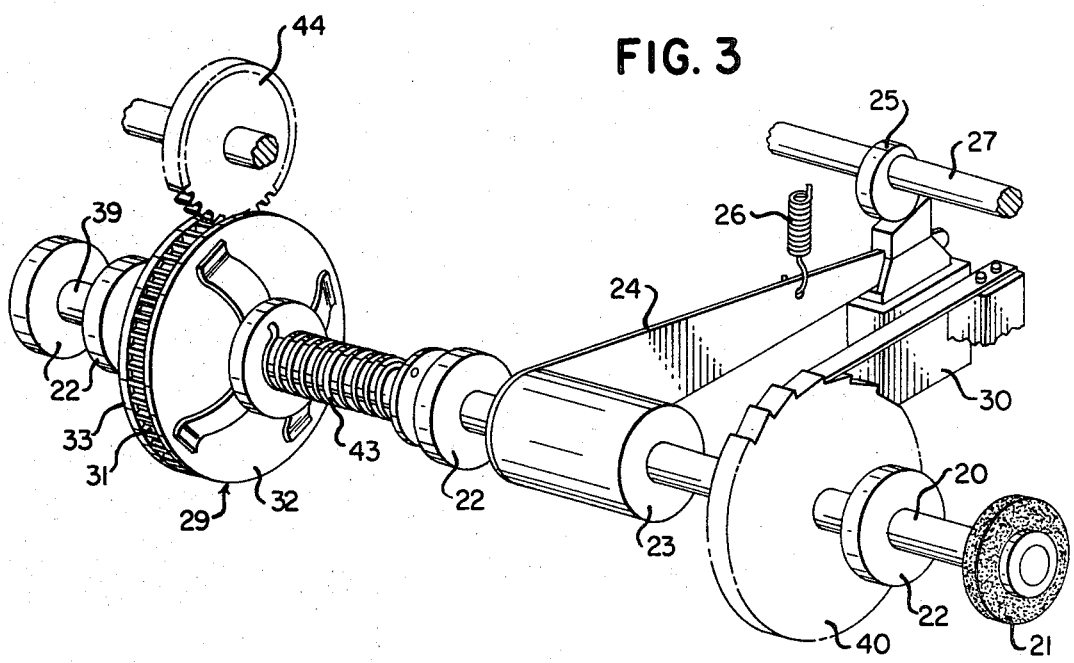

INDEXING MECHANISM

BACKGROUND OF THE INVENTION

This invention is directed to a high-speed mechanism for moving a strip of material to a printing position. This material may be a strip of labels or tags on which color bars are printed to represent coded information, or it may be the ink-coated ribbon from which the color bars are printed. In the latter case, it is critical to the cost of operation of the printing mechanism that all of the available ribbon be used. Therefore, it is an object of this invention to provide an indexing mechanism which provides a very high degree of accuracy in moving a strip of material a predetermined distance while operating at a high rate of speed, where the cost of construction and operation is low.

SUMMARY OF THE INVENTION

An indexing system, for moving a strip of tags or an ink printing ribbon to a predetermined position, which includes an oscillating cam follower arm which, through the operation of a roller clutch, rotates an indexing shaft in one direction. The indexing shaft is connected to a slip clutch which exerts a drag torque on the shaft only when the shaft is being indexed. An indexing wheel mounted on the indexing shaft feeds the tags or the ribbon a distance commensurate with the rotation of the shaft.

A variation of this system includes a ratchet wheel fixed to the indexing shaft. The ratchet wheel, together with a stop pawl, divides each revolution of the shaft into a fixed number of ratchet teeth sensed by the pawl, thereby eliminating any accumulation of error which could occur over a large number of indexing operations in the first system due to manufacturing tolerances of the parts that constitute the indexing system.

BRIEF DESCRIPTION OF THE DRAWINGS

FIG. 3 is an oblique view of a further embodiment of the indexing mechanism of FIG. 1, which includes a ratchet wheel and a stop pawl.

FIG. 4 is an oblique view of another embodiment of the indexing mechanism of FIG. 3.

DESCRIPTION OF THE PREFERRED EMBODIMENT

Figure 1:
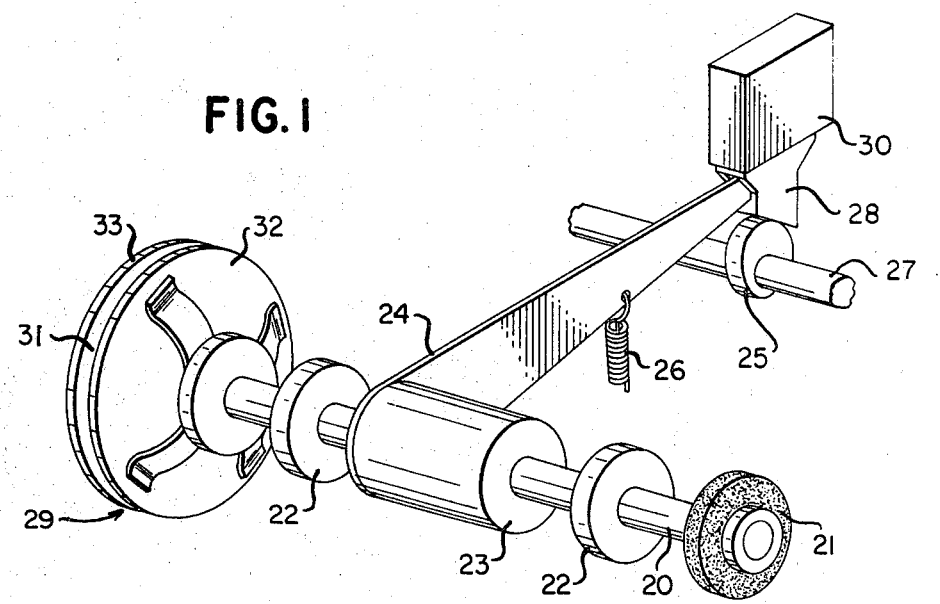
FIG. 1 is an oblique view of the indexing mechanism disclosed in this application.

Referring now to FIG. 1, there is shown one embodiment of the indexing mechanism. Included in the mechanism is an indexing shaft 20, to which is mounted at one of its ends an indexing wheel 21. The indexing wheel normally engages the strip of material to be moved against a pressure roller (not shown). As viewed in FIG. 1, the indexing wheel is rotated counter-clockwise during an indexing operation.

The indexing shaft 20 is normally supported by a pair of bearings 22 and is engaged by a roller clutch 23, which is connected to one end of a cam follower arm 24. The other end of the cam follower arm 24 is normally urged into engagement with a cam member 25 by a spring 26, mounted between the cam follower arm 24 and an anchor member (not shown). The cam member 25 is mounted on a cam shaft 27, which is rotated by a drive mechanism (not shown). Mounted on the end of the cam follower arm 24 is an armature member 28, which is located adjacent an electromagnetic control member 30. Upon rotation of the cam member 25 by the shaft 27, the cam follower arm 24 is rocked clockwise and then counter-clockwise about the indexing shaft 20. When the cam follower arm is in its full counter-clockwise position, the armature 28 is in such close proximity with the electromagnetic member 30 that, if the magnet is energized at that time, the armature is latched, thereby holding the cam follower arm 24 from engagement with the cam member 25.

Mounted on the other end of the indexing shaft 20 is a slip clutch 29 comprising a stationary disc 31 and two discs 32, 33, which are secured to the shaft 20. The stationary disc 31 frictionally engages the discs 32 and 33. In the operation of the mechanism, the cam shaft 27 is normally rotating, and the cam follower arm 24 is latched by the magnetic member 30. When it is desired to move the tag or label to a printing position, the electromagnetic member 30 is de-energized when the cam 25 is at its high point of travel. The de-energization of the electromagnetic member 30 allows the spring 26 to move the cam follower arm 24 into engagement with the cam 25, which then moves downwardly through the action of the spring 26 and the cam 25. As the cam follower arm 24 moves downwardly, the roller clutch 23 will overrun and turn freely on the indexing shaft 20. As the cam 25 continues its rotation, the cam follower arm 24 moves upwardly, thereby allowing the roller clutch 23 to engage the indexing shaft 20 and thus turn the shaft counter-clockwise commensurate with the upward movement of the cam follower arm. Rotation of the shaft 20 results in the indexing wheel 21 moving the strip of material a predetermined distance which is determined by the length of the upward movement of the cam follower arm 24.

As the cam follower arm 24 reaches the top of the upward movement, it may at this time be latched by the energization of the electromagnetic member 30, or it may continue for another cycle of operation. It is thus seen that the roller clutch 23 allows the indexing shaft 20 to be rotated only in a counter-clockwise direction.

During the counter-clockwise rotation of the indexing shaft 20, the slip clutch 29 provides a frictional torque or drag sufficient to overcome the inertia torque of the indexing shaft 20 and thus stop the shaft at the end of each step of movement. The clutch 29 also keeps the indexing shaft 20 from turning backwards during the overrunning portion of the cycle, due to the friction between the shaft and the roller clutch 23. The indexing shaft 20 continues to advance one step per revolution of the cam 25 until the electromagnetic member 30 is energized and the cam follower 24 is latched.

Figure 2:
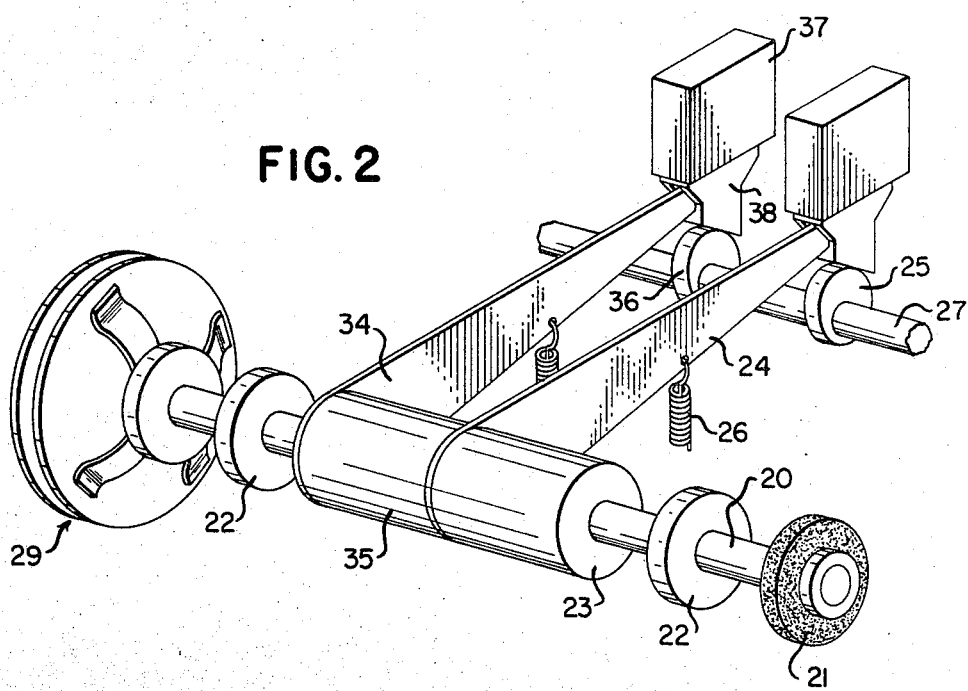
FIG. 2 is an oblique view of another embodiment of the indexing mechanism of FIG. 1.

Referring now to FIG. 2, there is shown a modification of the indexing mechanism of FIG. 1, which includes a second cam follower 34, a second roller clutch 35, a second cam member 36 secured to the cam shaft 27, and a second electromagnetic member 37 for latching the armature 38 mounted on the cam follower 34 when energized. The cam member 36 is of a size different from that of the cam member 25, thereby providing the indexing wheel 21 with a step of movement different in size from that provided by the cam member 25. In the operation of this indexing mechanism, the cam follower arm which will give the desired step size that is required is unlatched and follows its cam member for operating the indexing wheel 21, while the other cam follower is latched by its electromagnetic member. In this way, steps of different sizes can be selected. It is obvious that any number of cam follower arms can be mounted on the indexing shaft 20 to give any number of different step sizes to the indexing wheel 21.

While the indexing mechanism shown in FIG. 1 is simple and provides good step size accuracy, any error in step size due to manufacturing tolerances in the various elements of the mechanism will be cumulative as the operation progresses. Thus, even though the accuracy on each step is sufficient, the accumulation of a large number of steps may be objectionable. In order to eliminate this accumulation of error, this invention provides a ratchet mechanism including a ratchet wheel 40 (FIG. 3), which is mounted on the indexing shaft 20 and which contains on its edge surface a number of teeth 41 engaged by a ratchet stop pawl 42 mounted adjacent the indexing mechanism. The function of the ratchet wheel 40 is to divide each rotation of the indexing shaft 20 into a fixed number of teeth of the ratchet wheel which are engaged by the ratchet stop pawl 42.

The indexing shaft 20 is split into two parts, with the outer part 39 supporting the slip clutch 29. Both parts of the indexing shaft are connected together by means of a torsional spring 43. The outer discs 32, 33 of the slip clutch 29 are secured to the outer indexing shaft 39, while the center disc 31 is rotatably mounted on the shaft. A drive member 44 engages the center disc 31 and rotates it continuously clockwise to generate a frictional torque on the outer indexing shaft 39 through the discs 32, 33. This torque winds up the torsional spring 43 until it is equalized by the torque of the torsional spring 43. In the operation of the high-accuracy indexing mechanism (FIG. 3), the cam follower arm 24 rotates the indexing shaft 20 and, by means of the torsional spring 43, the outer indexing shaft 39 counter-clockwise in the manner previously described for advancing the strip of material to a printing position. Since, as shown in FIG. 3, the cam member 25 is mounted above the cam follower arm 24, the cam follower spring 26 operates the cam follower arm 24 during the rotation of the indexing shaft 20 as contrasted with the cam 25 in the previous systems. As the cam follower arm 24 completes its counter-clockwise movement, the roller clutch 23 will have rotated the indexing shaft 20 through a slightly larger angle than that required for the desired step length. The torsional spring 43, which is, at this time, wound up due to the frictional torque generated by the rotating center disc 31 of the slip clutch 29, as described previously, will rotate the indexing shaft 20 back with the roller clutch 23 as the cam follower arm 24 starts to move downwardly in a clockwise direction. Rotation of the indexing shaft 20 in this manner rocks the ratched wheel 40 against the stop pawl 42, thus locking the indexing shaft 20 into its operated position. This stopping of the indexing shaft 20 also unlocks the roller clutch 23 from engagement with the shaft, thereby allowing the roller clutch to turn freely on the indexing shaft while the cam follower arm completes its clockwise movement under the action of the cam member 25 against the action of the spring 26. Thus the accuracy of each step of the indexing wheel is independent of the previous step and is effected only by the accuracy of location of the ratchet teeth 41 on the ratchet wheel 40.

Referring now to FIG. 4, there is shown a modification of the high-accuracy indexing mechanism disclosed in FIG. 3. In this embodiment, the outer discs 32, 33 of the slip clutch 29 are secured to the indexing shaft 20. The center disc 31 of the slip clutch is secured to a second cam follower arm 46, which engages a second cam member 47 secured to the cam shaft 27 by the action of a spring 48. An electromagnetic member 50 latches the cam follower arm 46 by means of an armature 51 mounted on the end of the cam follower arm. As both cam followers 24, 46 are rocked counter-clockwise about the indexing shaft 20 by their respective cams and springs, the roller clutch 23 and the slip clutch 29, working in unison, rotate the indexing shaft 20 counter-clockwise through a slightly larger angle of rotation than that required for the desired step length. Then, as the cam follower arms start the beginning of their downward, or clockwise, movement, the torque exerted on the indexing shaft 20 by the discs 32, 33 of the slip clutch 29, due to the clockwise movement of the center disc 31, turns the shaft 20 and the roller clutch 23 backwards until the ratchet wheel 40 is firmly engaged against the stop pawl 42. The stop pawl 42 stops the clockwise movement of the indexing shaft 20, thereby allowing the roller clutch 23 to turn freely on the shaft 20, with the slip clutch 29 slipping during the remainder of the downward movement of the cam followers. Thus again, the accuracy of each step of travel of the indexing wheel 21 is independent of the previous step and is effected only by the accuracy of position of the ratchet teeth 41 on the ratchet wheel. It is thus seen that by this construction a very high accuracy of movement can be given to the indexing wheel by the cam follower arm and the ratchet wheel, which construction will operate at very high speeds but which is simple in construction and low in cost.

We claim:

1. An indexing mechanism for moving a strip of material a predetermined distance including
   a. an indexing shaft;
   b. a drive means secured to said indexing shaft and engaging said strip of material;
   c. means for rotating said indexing shaft a predetermined distance in one direction only, including
   d. clutch means engaging said indexing shaft and adapted to rotate said shaft in an indexing and non-indexing direction;
   e. means engaging said clutch means for actuating said clutch means in an indexing and non-indexing direction;
   f. a ratchet wheel mounted on said indexing shaft, said ratchet wheel having a plurality of edge-mounted teeth members;
   g. and a stop pawl member mounted adjacent said ratchet wheel, said pawl member being adapted to engage the teeth members of said ratchet wheel upon rotation of said indexing shaft in a non-indexing direction only thereby stopping the rotation of said indexing shaft whereby the strip of material is moved by said drive means a predetermined distance during the indexing rotation of the indexing shaft.

2. The indexing mechanism of claim 1 in which said clutch means includes
   a. a pair of stationary clutch plates engaging said indexing shaft;
   b. and a rotatably mounted clutch member engaging said clutch plates, said clutch member being engaged by said actuating means for movement in a non-indexing direction whereby said ratchet wheel is moved in a non-indexing direction until engaged by said stop pawl member.

3. The indexing mechanism of claim 2 in which said stationary clutch plates contain frictional surfaces thereon and said rotatably mounted clutch member contains frictional surfaces in engagement with the frictional surfaces of said clutch plate whereby upon movement of said clutch member in a non-indexing direction, said ratchet wheel is engaged by said stop pawl member.

4. The indexing mechanism of claim 2 in which said clutch means includes
   a. a second clutch member rotatably mounted on said indexing shaft and adapted to engage said indexing shaft when rotated in an indexing direction and to disengage said indexing shaft when rotated in a non-indexing direction;
   b. and said actuating means includes a first arm member mounted on said second clutch member;
   c. and a first cam member engaging said first arm member and adapted to rotate said first arm member a predetermined distance in said indexing and non-indexing direction whereby a strip of material is moved by said drive means a distance commensurate with the movement of said arm member in an indexing direction.

5. The indexing mechanism of claim 4 in which said second clutch member comprises a roller clutch.

6. The indexing mechanism of claim 4 in which said clutch means includes
   a. an indexing shaft extension member supporting said clutch plates;
   b. a torsion spring secured to said indexing shaft and said extension member;
   c. and said actuating means includes a constantly rotating drive member engaging said clutch member for moving said clutch member in a non-indexing direction whereby said torsion spring will constantly urge said indexing shaft in a non-indexing direction.

7. The indexing mechanism of claim 6 in which
   a. the peripheral edge of said clutch member comprises a plurality of tooth portions;
   b. and said drive member comprises a gear member engaging the tooth portions of said clutch member whereby the clutch member is constantly rotated in a non-indexing direction.

8. The indexing mechanism of claim 4 in which said actuating means includes a. a second arm member mounted on said clutch member;
b. and a second cam member engaging said second arm member and adapted to rotate said second arm member a predetermined distance in said indexing and non-indexing direction whereby said stop pawl member will engage and stop the movement of said ratchet wheel during the rotation of said second arm member in a non-indexing direction.

9. The indexing mechanism of claim 8 which includes
a. latching means mounted on said first arm members;
b. and control means mounted adjacent said first arm member and adapted to latch said latching means when operated thereby disabling the operation of said first arm member by said first cam member.

10. The indexing mechanism of claim 9 in which said latching means comprises an armature member secured to said first arm member and said control means comprises an electromagnetic member positioned adjacent said armature member whereby, upon energization of said electromagnetic member, said first arm member is disabled from engagement with said first cam member.

11. The indexing mechanism of claim 9 which includes
a. second latching means mounted on said second arm member;
b. and a second arm member to latch said second latching means when operated thereby disabling the movement of said ratchet wheel in a non-indexing direction.

12. The indexing mechanism of claim 11 which includes resilient means normally engaging said first and second arm member for movement into engagement with said first and second cam members.

13. An indexing mechanism for moving a strip of material a predetermined distance in one direction including
a. a rotatably mounted indexing shaft;
b. a drive member secured to said indexing shaft and engaging said strip of material;
c. a rotatably mounted first clutch member mounted on said indexing shaft, said first clutch member adapted to engage said indexing shaft when rotated in an indexing direction thereby rotating the indexing shaft a like distance and to disengage the indexing shaft when rotated in a non-indexing direction whereby the strip of material is moved by said drive member during the rotation of said indexing shaft;
d. a second clutch member engaging said indexing shaft, said second clutch member adapted to be rotated in an indexing and non-indexing direction;
e. actuating means engaging said first and second clutch members for rotating said clutch members in a indexing and non-indexing direction; said actuating means includes cam actuated arm members engaging said clutch members for rotating said clutch members in a indexing and non-indexing direction;
f. a ratchet wheel secured to said indexing shaft, said ratchet wheel having a plurality of rearwardly facing edge-mounted teeth members;
g. and a stop pawl mounted adjacent said ratchet wheel, said stop pawl adapted to engage the teeth members of said ratchet wheel upon rotation of said ratchet wheel in a non-indexing direction thereby stopping the rotation of said ratchet wheel and said indexing shaft whereby the strip of material is moved by said drive member a predetermined distance.

14. The indexing mechanism of claim 13 in which
a. said cam actuated arm members have armature members mounted on their ends;
b. and said actuating means includes electromagnetic members mounted adjacent the armature members and adapted, upon operation, to engage the armature members, thereby disabling the movement of said arm members.

* * * * *